(12) United States Patent
Chen et al.

(10) Patent No.: US 9,978,184 B2
(45) Date of Patent: May 22, 2018

(54) METHODS AND APPARATUSES FOR MARKING TARGET IN 3D IMAGE

(71) Applicants: Tsinghua University, Haidian District, Beijing (CN); Nuctech Company Limited, Haidian District, Beijing (CN)

(72) Inventors: Zhiqiang Chen, Beijing (CN); Yuanjing Li, Beijing (CN); Ziran Zhao, Beijing (CN); Shuo Wang, Beijing (CN); Jianping Gu, Beijing (CN); Yunda Sun, Beijing (CN)

(73) Assignees: Tsinghua University, Haidian District, Beijing (CN); Nuctech Company Limited, Haidian District, Beijing (CN)

(*) Notice: Subject to any disclaimer, the term of this patent is extended or adjusted under 35 U.S.C. 154(b) by 25 days.

(21) Appl. No.: 14/540,440

(22) Filed: Nov. 13, 2014

(65) Prior Publication Data

US 2015/0154809 A1 Jun. 4, 2015

(30) Foreign Application Priority Data

Nov. 18, 2013 (CN) .......................... 2013 1 0574315

(51) Int. Cl.
*G06T 19/20* (2011.01)
*G06T 15/08* (2011.01)
*G06T 17/00* (2006.01)
*G06T 7/00* (2017.01)
*G06T 15/06* (2011.01)
*G06T 15/10* (2011.01)

(52) U.S. Cl.
CPC ............ *G06T 19/20* (2013.01); *G06T 7/0012* (2013.01); *G06T 15/06* (2013.01); *G06T 15/08* (2013.01); *G06T 15/10* (2013.01); *G06T 17/005* (2013.01); *G06T 2207/10136* (2013.01); *G06T 2210/12* (2013.01); *G06T 2219/2021* (2013.01)

(58) Field of Classification Search
None
See application file for complete search history.

(56) References Cited

U.S. PATENT DOCUMENTS

| 2005/0285858 | A1 | 12/2005 | Yang et al. | |
| 2006/0143215 | A1* | 6/2006 | Truyen | ................. G06T 11/008 |
| 2007/0064002 | A1 | 3/2007 | Xue et al. | |
| 2008/0024515 | A1 | 1/2008 | Yang et al. | |
| 2012/0293515 | A1* | 11/2012 | Clarberg | ................. G06T 15/10 |
| | | | | 345/441 |

FOREIGN PATENT DOCUMENTS

WO 2013/142072 A2 9/2013

OTHER PUBLICATIONS

Young et al ("Characterization of Chromatin Distribution in Cell Nuclei", 1986, Cytometry).*

(Continued)

*Primary Examiner* — Xin Sheng
(74) *Attorney, Agent, or Firm* — Merchant & Gould P.C.

(57) ABSTRACT

The present disclosure provides method and apparatus for marking a target in a 3D image. The method include steps of: acquiring Computed Tomography (CT) image data of a scene; rendering a 3D image of the scene using ray casting based on the CT image data; removing a transparent region from the 3D image based on a fixed 2D transfer function; and marking the target in the 3D image.

7 Claims, 5 Drawing Sheets

(56) References Cited

OTHER PUBLICATIONS

Extended European Search Report for corresponding European Patent Application No. 14193142.8 dated Dec. 22, 2015.
"Direct Volume Rendering", Stuttgart Visualization Course, XP055231352, pp. 1-34 (2006).
Vidal, V. et al., "Simple empty-space removal for interactive volume rendering", Journal of Graphics Tools A.K. Peters Ltd., 13(2): 21-36 (2008).
Ying, Z. et al., "Dual Energy Volumetric X-ray Tomographic Sensor for Luggage Screening", Proceedings of the 2007 IEEE Sensors Applications Symposium, pp. 1-6 (2007).
Li, W. et al., "Empty space skipping and occlusion clipping for texture-based volume rendering", *Proceedings of IEEE Visualization*, 317-324 (2003).
Max, N., "Optical models for direct volume rendering", *IEEE Transactions on Visualization and Computer Graphics*, 1(2): 99-108 (1995).

\* cited by examiner

METHODS AND APPARATUSES FOR MARKING TARGET IN 3D IMAGE

This application claims benefit of Serial No. 201310574315.2, filed 18 Nov. 2013 in China and which application is incorporated herein by reference. A claim of priority is made to the above disclosed application.

TECHNICAL FIELD

The present disclosure relates to 3-Dimensional (3D) image rendering, and more particularly, to methods and apparatuses for rapidly marking a target in a 3D image.

BACKGROUND

The multi-energy X-ray security inspection system is a new security inspection system developed on the basis of the single-energy X-ray security inspection system. In addition to providing shape and content of inspected objects, the system can provide information about effective atomic number of the objects to distinguish organic and inorganic objects, and display them in different colors on a color monitor to help an operator identify them. During inspecting and scanning a package, the operator wants to rapidly mark one target, for example, each 3 to 5 seconds. This requires automatic removal of any blank region in data preprocessing phase, so that a user can pick up a desired region including the target without dragging a mouse for a long distance to moving a marking arrow across the invalid data regions.

The Ray Casting method is one of the existing volume rendering techniques (Max N. Optical models for direct volume rendering. IEEE Transactions on Visualization and Computer Graphics, 1995, 1(2): 99-108) that are mostly used. In this method, a ray is emitted along a fixed direction from each image pixel, and the ray penetrates the entire sequence of images. During this process, the images of the sequence are sampled and classified to obtain color values, and the color values are accumulated according to a ray absorption module until the ray passes through the entire sequence of images. The finally obtained color values are colors for a rendered image.

In the Ray Casting method, an often-used accelerating technique is Empty Space Skipping (Wei Li, Klaus Mueller, and Arie Kaufman. Empty space skipping and occlusion clipping for texture-based volume rendering. In Proceedings of IEEE Visualization, pp. 317-324. Los Alamitos, Calif.: IEEE Press, 2003). The existing transparent region skipping methods are primarily used for acceleration in case of using one-dimensional transfer functions. Such methods have poor accuracy and low speed. Further, these conventional methods are used in case whether the transfer function can be adjusted in real time.

SUMMARY

In view of the above, the present disclosure provides a method for rapidly marking a target in a 3D image, which can remove transparent regions from the rendered 3D image in a rapid and accurate manner. In particular, an object of the present disclosure is to provide a method for rapidly and accurately marking a target in a 3D image, because identification of an object is commonly practiced in Computed Tomography (CT) systems for security inspection.

The above object is achieved by providing a method for marking a target in a 3D image, comprising steps of: acquiring Computed Tomography (CT) image data of a scene; rendering a 3D image of the scene using ray casting based on the CT image data; removing a transparent region from the 3D image based on a fixed 2-Dimensional (2D) transfer function; and marking the target in the 3D image with the transparent region being removed.

According to an embodiment, said removing a transparent region comprises: building an octree for describing a 3D space data structure of the CT image data; traversing the octree to determine whether each node of the octree is transparent; and removing each transparent node.

According to another embodiment, the method further comprises after removing the transparent region: generating a level enclosure box that encloses a valid region, and generating a valid-region axial enclosure box based on the level enclosure box.

According to another embodiment, the valid-region axial enclosure box is used as a start position for marking the target.

According to another embodiment, said removing a transparent region further comprises: generating a lookup table of transparency maxima independent of the building of the octree.

According to another embodiment, said building an octree comprises: setting a height of the octree, and allocating the CT image data on a level basis to each node of the octree based on the height.

According to another embodiment, said determining of whether each node is transparent is based on a minimal gray value, a maximal gray value, a minimal material value and a maximal material value of the node.

According to another embodiment, opacity of the node is obtained by means of the lookup table of transparency maxima.

With the marking method of the present disclosure, it is possible to rapidly and accurately removing transparent regions from CT image data so that the operator can quickly fulfill the task of marking a target region. This can greatly improve both efficiency and accuracy for the operator marking the target region.

BRIEF DESCRIPTION OF THE DRAWINGS

The above and other aspects of the present disclosure will be apparent and illustrated with reference to embodiments in the following. In figures.

DETAILED DESCRIPTION OF THE EMBODIMENTS

The particular embodiments of the disclosure are described below in details. It shall be noted that the embodiments herein are used for illustration only, but not limiting the disclosure. In the description below, a number of particular details are explained to provide a better understanding to the disclosure. However, it is apparent to those skilled in the art the disclosure can be implemented without these particular details. In other examples, well-known circuits, materials or methods are not described so as not to obscure the disclosure.

Throughout the specification, reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred at various positions throughout the specification may not refer to one and the same embodiment or example. Furthermore, specific features, structures or properties may be combined into one or several embodiments or examples in any appropriate ways. Moreover, it should be understood by those skilled in the art that figures here are for the purpose of illustration, and not necessarily drawn to scale. The term "and/or" used herein means any and all combinations of one or more listed items.

Currently, the Ray Casting method is commonly used for rendering 3D images. Transparent region skipping technique is often used in the Ray Casting method to accelerate the rendering process. A transparent region refers to a data block in which every voxel has a corresponding α equal to 0. α denotes opacity, i.e., the light transmittance of an object. The value of α may be obtained by looking up transfer functions in 3D image rendering. In the compositing process of the Ray Casting method, each voxel having α equal to 0 does not contribute to the final result of 3D image rendering. Accordingly, the rendering can be accelerated by skipping such voxels in sampling and compositing processes.

Figure 1:
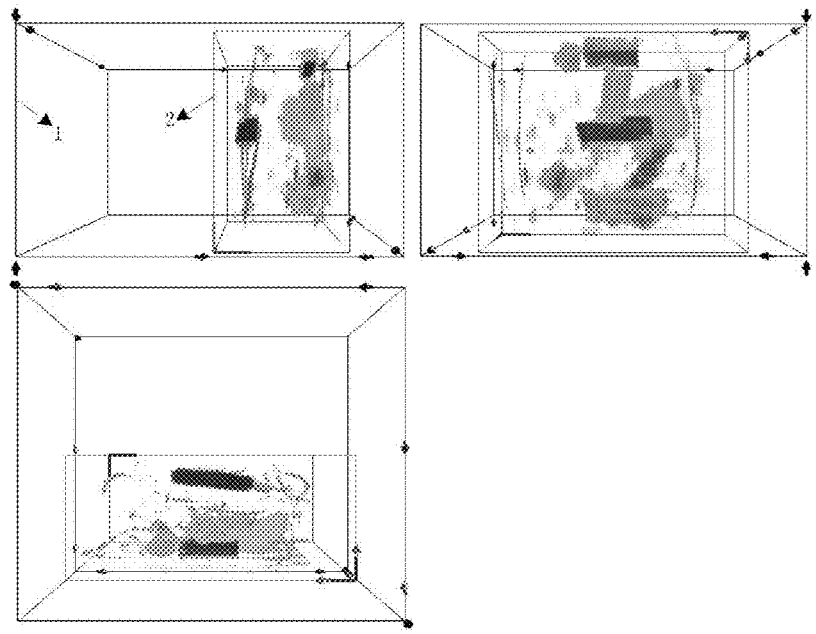
FIG. 1 is a schematic diagram showing an enclosure box used in rendering a 3D image.

FIG. 1 is a schematic diagram showing an enclosure box used in rendering a 3D image using the Ray Casing method. The enclosure box includes an actual enclosure box denoted by line box 1, and an opaque-region enclosure box denoted by line box 2. It can be seen that the actual enclosure box also includes transparent regions.

Figure 2:
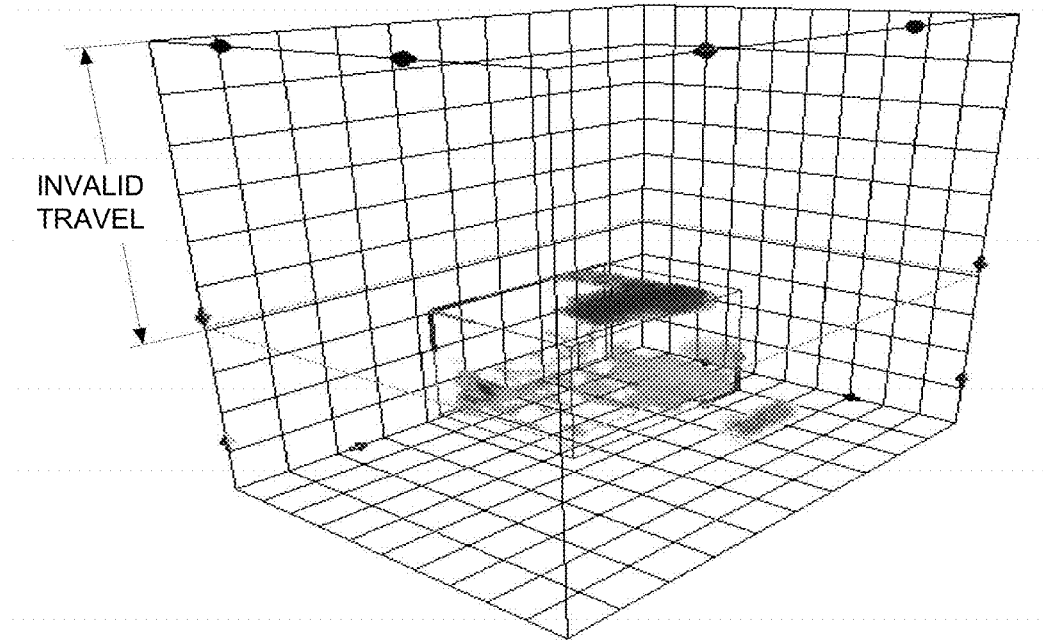
FIG. 2 is a schematic diagram showing an invalid travel of a marking tool during a marking process.

FIG. 2 is a schematic diagram showing an invalid travel of a marking tool during a marking process. A mouse is usually used to mark a target, for example, in CT systems for security inspection. If the transparent regions cannot be skipped, a user has to drag the mouse for a long distance to pass through these invalid regions before selecting desired target regions.

Figure 3:
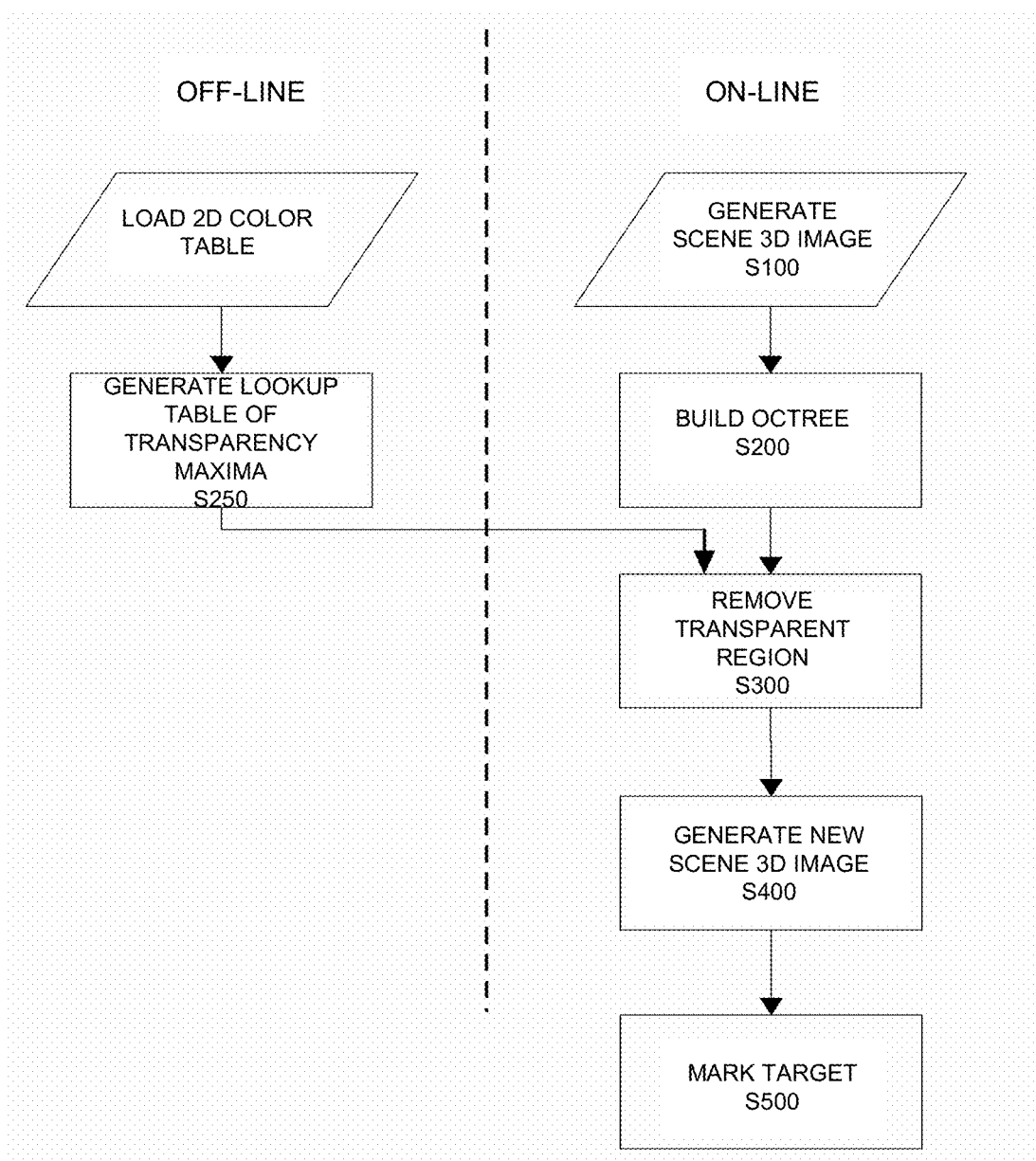
FIG. 3 is a flowchart of a method according to an embodiment of the disclosure.

FIG. 3 is a flowchart of a method according to an embodiment of the disclosure. The method can remove transparent regions from CT data in rapid and accurate manner.

In this embodiment, a CT 3D image is first rendered by the Ray Casting method at step S100.

Then, an octree is built based on CT volume data at step S200. The octree is a tree-type data structure for describing a 3D image space. Each node of the octree represents a volume element of a cube, and has 8 child nodes. A sum of the volume elements of the 8 child nodes is equivalent to the volume of the parent node. A height is set for the octree, and volume data are allocated on a level basis to the respective nodes of the octree.

Figure 4:
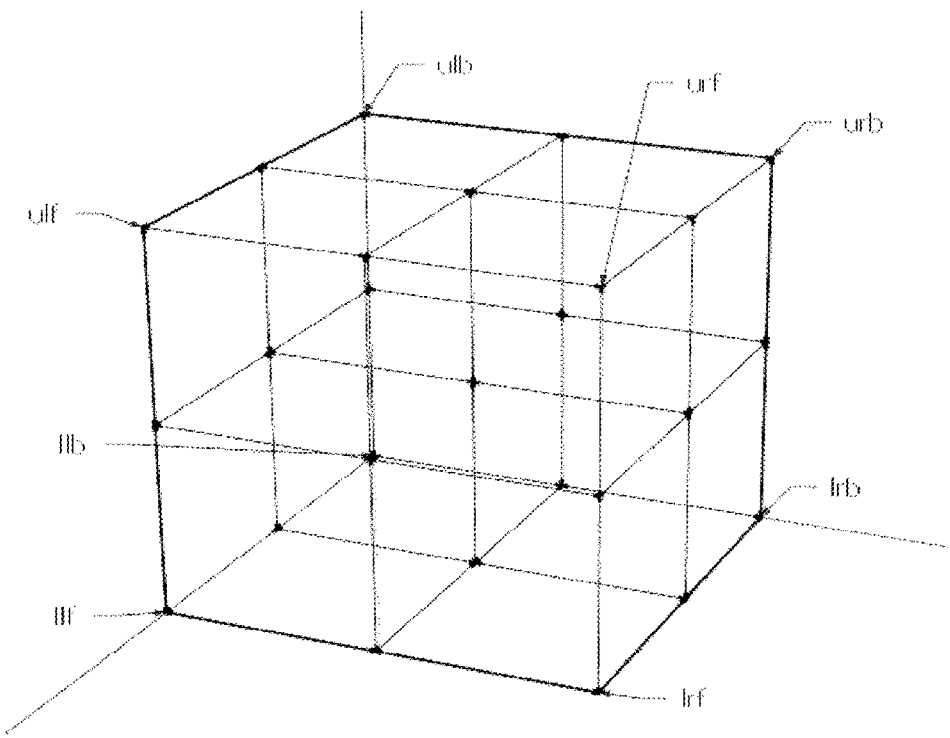
FIG. 4 is a schematic diagram showing an octree describing data structure of 3D image space according to an embodiment of the method in the present disclosure.

FIG. 4 shows an example of an octree node according to an embodiment of the present disclosure. The example octree node has data structure defined as follows.

```
struct OctreeNode {
    tgt::vec3 coordllf; //lower left front side
    tgt::vec3 coordurb; //upper right back side
    float minvox;
    float maxvox;
    float mingrad;
    float maxgrad;
    bool opaque;
    OctreeNode* parent; //parent node
    OctreeNode* llf; //child node
    OctreeNode* lrf;
    OctreeNode* ulf;
    OctreeNode* urf;
    OctreeNode* llb;
    OctreeNode* lrb;
    OctreeNode* ulb;
    OctreeNode* urb;
}
```

Here, coordllf and coordurb are coordinates of vertices in the world coordinate system, and minvox, maxvox, mingrad and maxgrad denote the minimal gray value, the maximal gray value, the minimal material value and the maximal material value of a current node. Parent denotes the parent node of the current node.

Next, the transparent regions are removed based on a fixed transfer function at step S300. For a CT apparatus, a fixed color table has been designed with respect to information of gray and material. Therefore, by traversing the built octree, whether the current node is transparent may be determined based on the minimal gray value, the maximal gray value, the minimal material value and the maximal material value of the current node, i.e., obtaining the maximal value of α for the region. Since the transfer function is fixed, the transparency mapping relation for gray and material is the same for different CT data. In an embodiment of the present disclosure, a lookup table of transparency maxima is generated in an off-line stage at step S250 in order to reduce time required for traversing the octree.

The transparency is defined in the following equation:

$$\alpha = f(g, m)$$

where g represents gray value, and m represents material value.

Figure 5:
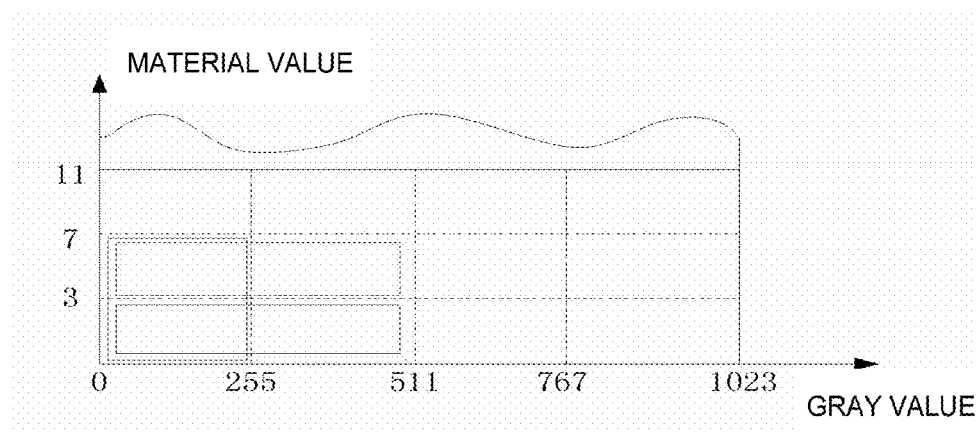
FIG. 5 is a schematic diagram showing a lookup table of transparency maxima generated according to an embodiment of the method in the present disclosure.

As can been seen from the color table pre-designed for the CT apparatus, change in gray value has small influence on the transparency, while change in material value has great influence on the transparency. Accordingly, a grid is divided at coarse granularity in the gray direction, and divided at fine granularity in the material direction, as shown in FIG. 5. On the basis of the newly-divided grid, the transparency maximum for each cell is first calculated. Then, the transparency maxima of all rectangular regions composed by the cells are statistically collected and stored in a one-dimensional lookup table. In an example, for a 2D color table of 1024×44 dimensions of the CT apparatus, a lookup table of transparency maxima is generated with a resolution of 4 in the gray direction and a resolution of 11 in the material direction. This set of resolutions is a tradeoff between accuracy of result and computation cost, and means that the lookup table is generated with a granularity having a size of 256×4 from the original color table of 1024×44 dimensions.

The generation of the lookup table of transparency maxima is independent of the building of the octree, and may be performed off-line. For example, the generation may be performed once in the initialization stage. By looking up the lookup table of transparency maxima in the process of traversing the octree, it is possible to speed up the determination of transparent regions and thus reduce time required for traversing the octree. In an example, use of the lookup table can reduce the time for traversing the octree from 700 ms to 130 ms (average time).

Figure 6:
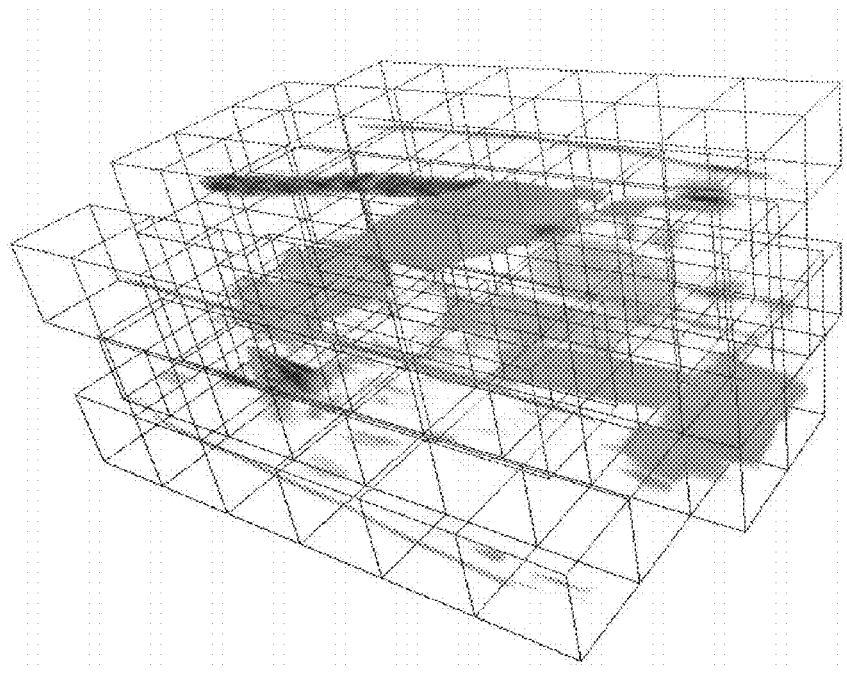
FIG. 6 is a schematic diagram showing an enclosure box after removal of transparent region according to an embodiment of the method in the present disclosure.

FIG. 6 shows a result of an octree having a height of 3 after removal of transparent region. At this time, a level enclosure box that closely encloses valid regions is obtained.

Figure 7:
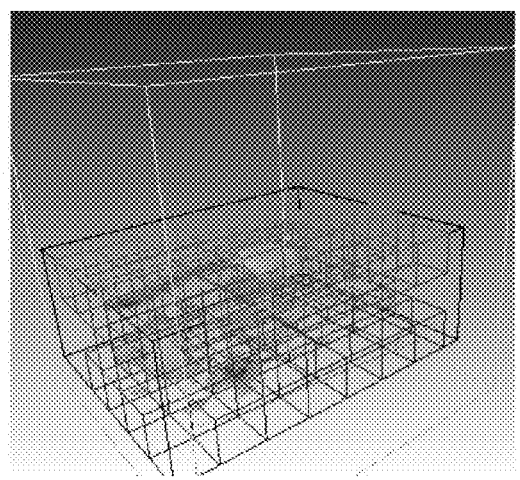
FIG. 7 is a schematic diagram showing a valid-region axial enclosure box according to an embodiment of the method in the present disclosure.

After removal of transparent region, a valid-region axial enclosure box is generated based on the level enclosure box. The valid-region axial enclosure box is schematically shown in FIG. 7 and denoted with a black solid line box. The valid-region axial enclosure box may be used as start position for marking a target.

Figure 8:
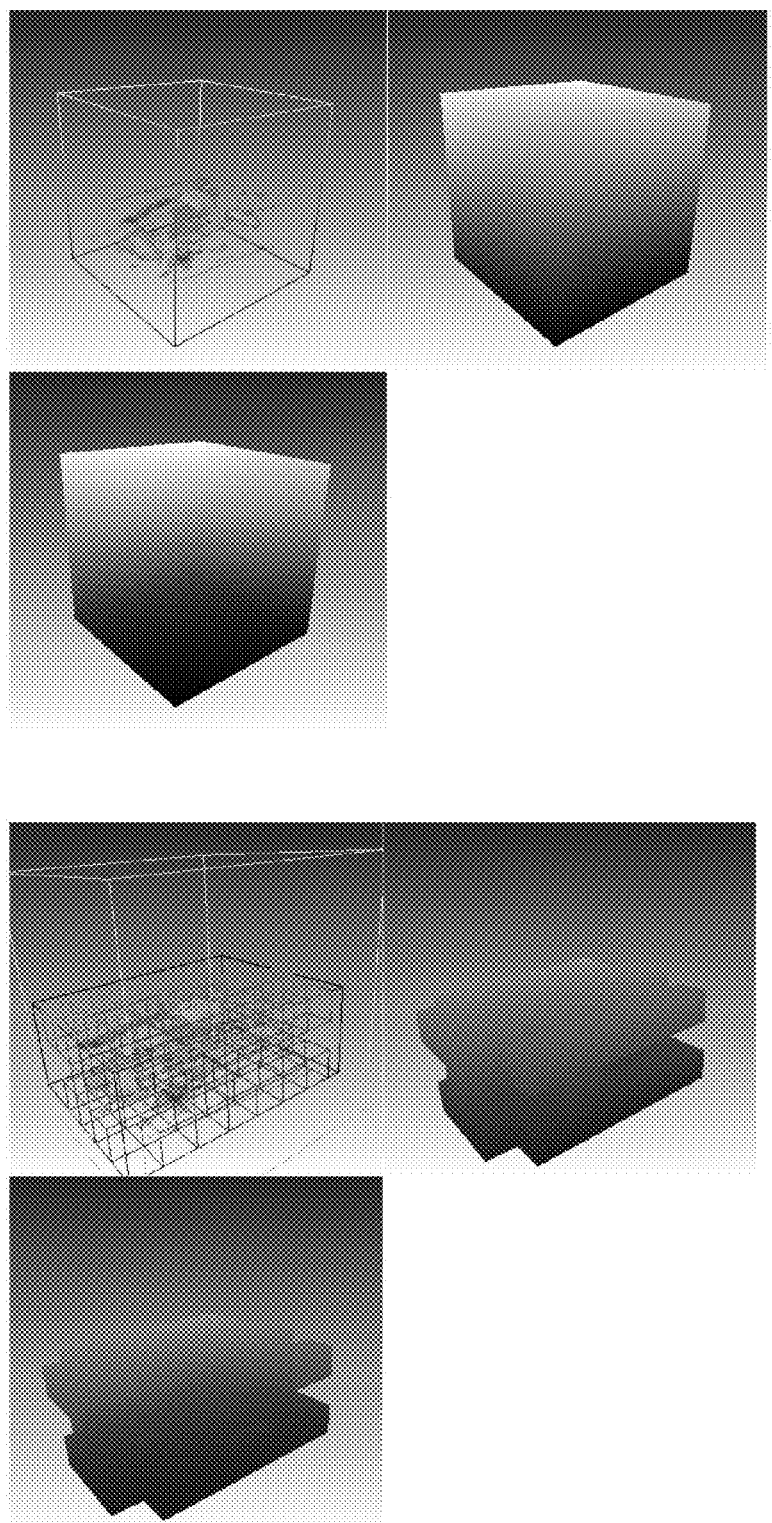
FIG. 8 shows comparison between 3D image rendered by the method of the present disclosure and 3D image not rendered by the method of the present disclosure.

In this way, a 3D image of the scene is re-rendered after removal of transparent region, as shown in step S400 of FIG. 3. FIG. 8 shows comparison between 3D image rendered by the method of the present disclosure and 3D image not rendered by the method of the present disclosure. The upper part of FIG. 8 shows front and rear depth images obtained without the method of the present disclosure, and the lower part of FIG. 8 shows front and rear depth images obtained with the method of the present disclosure. By using the method of the present disclosure, the transparent regions are greatly reduced, thereby facilitating the operator to manually mark the target.

Finally, the target region is identified and manually marked on the rendered 3D image of the scene at step S500. The operator may manually (e.g., using a mouse) mark the target region from the 3D image according to the color of the object. With the method of the present disclosure, it is possible to rapidly and accurately removing transparent regions from the 3D image of a scene so that the operator can quickly mark a target region. This can greatly improve both efficiency and accuracy for the operator marking the target region The method of the present disclosure may be implemented in computer software, computer hardware or combination thereof.

The embodiments here illustrate exemplarily the method for quickly mark a target in a CT 3D image. Those skilled in the art can understand that the disclosed embodiments can be modified or changed in various ways without departing from the spirit and scope defined by the appended claims.

The foregoing detailed description has set forth various embodiments of method and apparatus for marking a target in a 3D image by use of block diagrams, flowcharts, and/or examples. Insofar as such block diagrams, flowcharts, and/or examples contain one or more functions and/or operations, it will be understood by those skilled in the art that each function and/or operation within such examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of those skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the esprit or essence of the disclosure. It should be understood that the embodiments are not limited to any of the foregoing details, and shall be interpreted broadly within the esprit and scope as defined by the following claims. Therefore, Modifications and alternatives falling within the scope of the claims and equivalents thereof are to be encompassed by the scope of the present disclosure which is defined by the claims as attached.

What is claimed is:

1. A method for marking a target in a 3-Dimensional (3D) image in a Computed Tomography (CT) system for security inspection, the method comprising:
  acquiring CT image data of a scene;
  rendering a 3D image of the scene using ray casting based on the CT image data;
  removing a transparent region from the 3D image based on a fixed 2-Dimensional (2D) transfer function in which a fixed transparency mapping relation between a transparency of the region as well as a gray level of a region the target located in and material of the target is defined; and
  marking the target in the 3D image with the transparent region being removed,
  wherein said removing a transparent region further comprises:
    building an octree for describing a 3D space data structure of the CT image data;
    traversing the octree to determine whether each node of the octree is transparent based on a minimal gray level value, a maximal gray level value, a minimal material value, and a maximal material value of the current node by using the transparency mapping relation; and
    removing each transparent node determined;
    wherein the transparency mapping relation is preset by dividing a grid in the octree at a first granularity in a gray level direction and dividing the grid at a second granularity in a material direction, the first granularity is coarser than the second granularity.

2. The method according to claim 1, further comprising after removing the transparent region:
generating an enclosure box that encloses a valid region, and generating a valid-region axial enclosure box based on the enclosure box.

3. The method according to claim 2, wherein the valid-region axial enclosure box is used as a start position for marking the target.

4. The method according to claim 1, wherein said removing a transparent region further comprises:
generating a lookup table of transparency maxima independent of the building of the octree.

5. The method according to claim 1, wherein said building an octree comprises:
setting a height of the octree, and allocating the CT image data on a level basis to each node of the octree based on the height.

6. The method according to claim 1, wherein the transparency mapping relation is preset as a lookup table for transparency maxima.

7. An apparatus for marking a target in a 3-Dimensional (3D) image in a Computed Tomography (CT) system for security inspection, the apparatus comprising a processor configured to:
acquire CT image data of a scene;
render a 3D image of the scene using ray casting based on the CT image data;
remove a transparent region from the 3D image based on a fixed 2-Dimensional (2D) transfer function in which a fixed transparency mapping relation between a transparency of the region as well as a gray level of a region the target located in and material of the target is defined; and
mark the target in the 3D image;
wherein the processor is further configured to:
build octree for describing a 3D space data structure of the CT image data;
traverse the octree to determine whether each node of the octree is transparent based on a minimal gray level value, a maximal gray level value, a minimal material value, and a maximal material value of the current node by using the transparency mapping relation; and
remove each transparent node determined;
wherein the transparency mapping relation is preset by dividing a grid in the octree at a first granularity in a gray level direction and dividing the grid at a second granularity in a material direction, wherein the first granularity is coarser than the second granularity.

* * * * *